H. P. C. BROWNE & W. H. PALMER, Jr.
ROTATION INDICATING INSTRUMENT.
APPLICATION FILED JULY 18, 1907.
925,078.  Patented June 15, 1909.
3 SHEETS—SHEET 1.
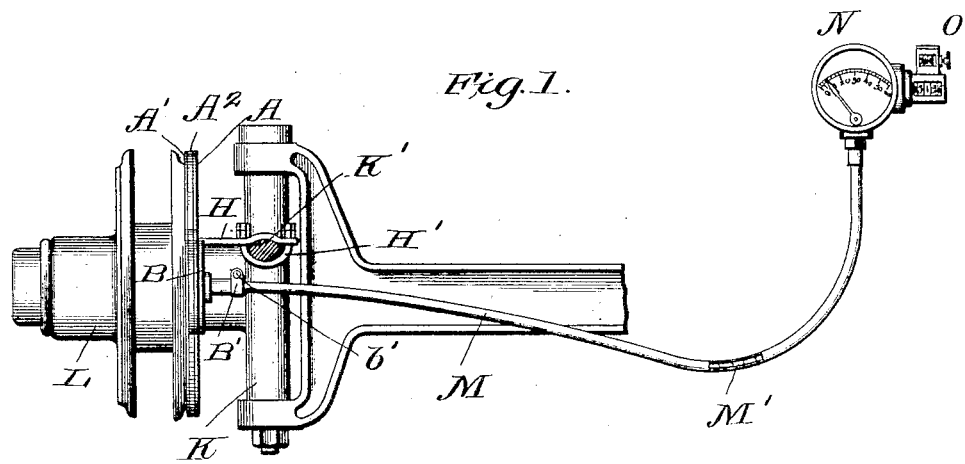
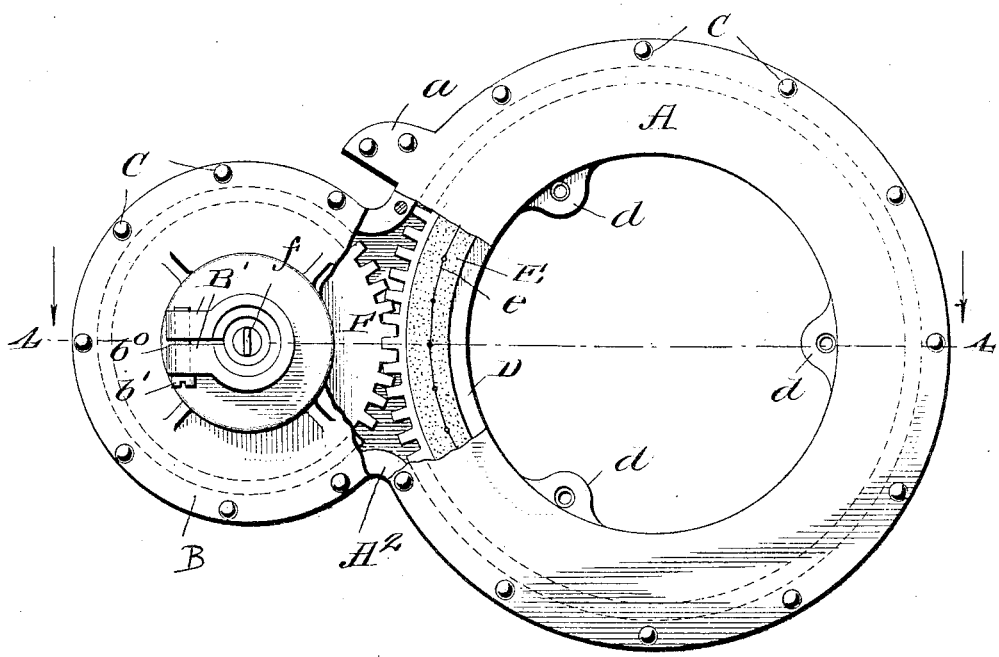
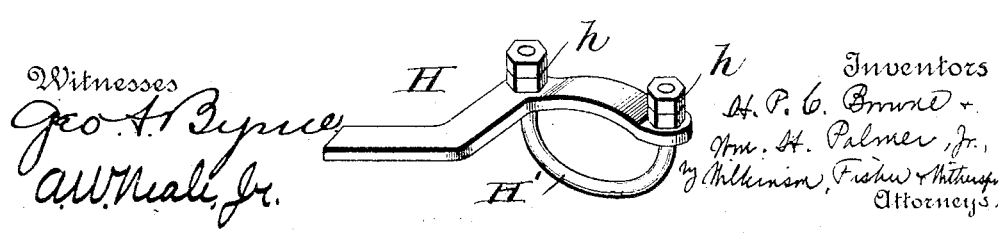

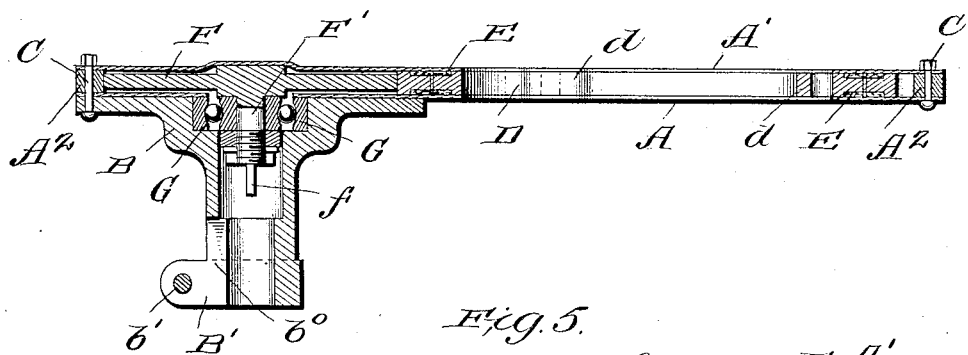
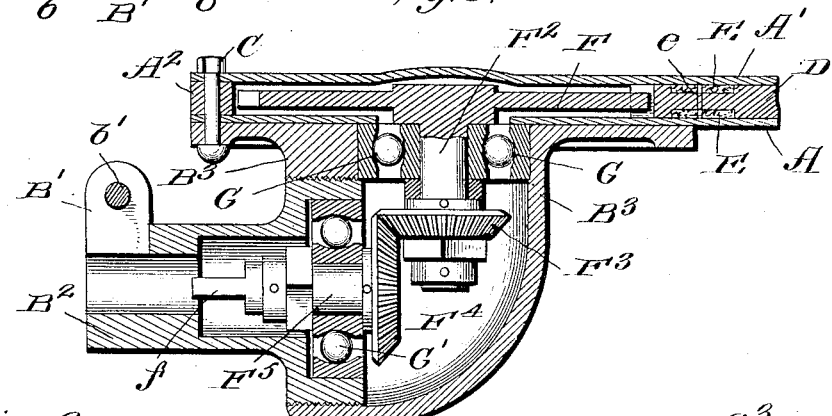
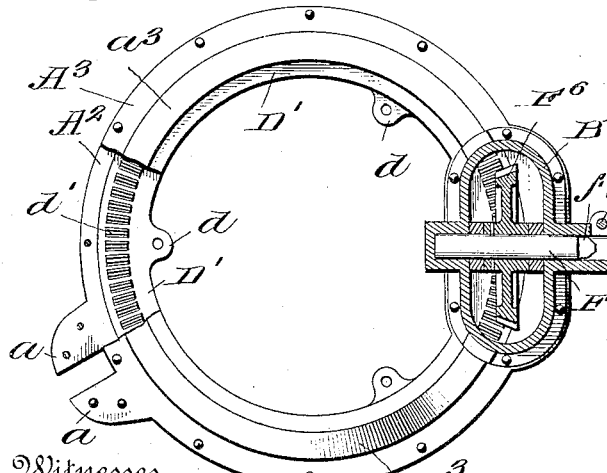
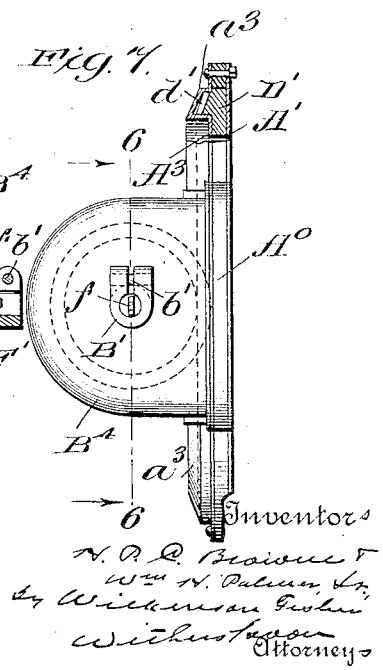

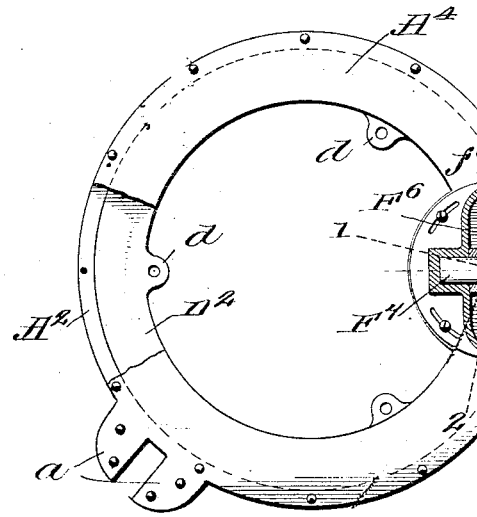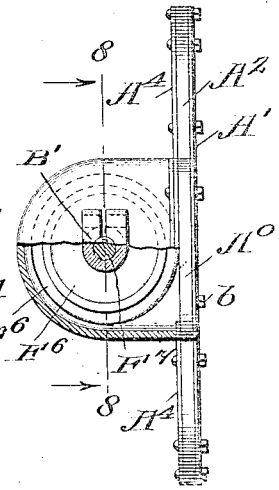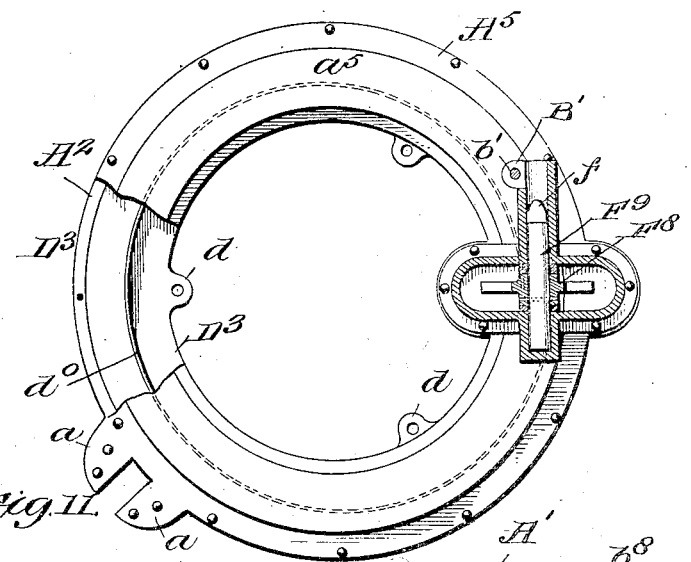

UNITED STATES PATENT OFFICE.

HARRY P. C. BROWNE AND WILLIAM H. PALMER, JR., OF NEW YORK, N. Y.

ROTATION-INDICATING INSTRUMENT.

No. 925,078.

Specification of Letters Patent.

Patented June 15, 1909.

Application filed July 18, 1907. Serial No. 384,470.

*To all whom it may concern:*

Be it known that we, HARRY P. C. BROWNE and WILLIAM H. PALMER, Jr., citizens of the United States, both residing at New York, in the borough of Manhattan and State of New York, have invented certain new and useful Improvements in Rotation-Indicating Instruments; and we do hereby declare the following to be a full, clear, and exact description of the invention, such as will enable others skilled in the art to which it appertains to make and use the same.

Our invention relates to improvements to an apparatus for operating any of the well-known rotation indicating, or registering, or recording instruments, by imparting to the said instruments a measure of the rotation of a rotating shaft or wheel.

Our present invention relates to an improvement on the apparatus shown in our application, Serial #269,416, filed July 12th, 1905.

According to our invention, we provide a single unitary structure, which is applied to the shaft or wheel, whose rotation is to be indicated, and we connect this structure to some adjacent fixed object, or the unitary structure may be mounted on a fixed object and connected to the rotating shaft or wheel. In the structure above referred to, we include two or more gear wheels for transmitting a measure of the rotation of the rotating body, and we operate by these gear wheels suitable speed indicating, registering, or recording instruments.

A simple embodiment of our invention is shown in the accompanying drawings in which the similar parts are indicated by similar letters throughout the several views.

Figure 1 is a diagrammatic view showing the instrument attached to the hub of an automobile wheel and held against rotation by an arm secured to the steering knuckle. The instrument in Fig. 1 is shown as attached to both a speedometer and an odometer. Fig. 2 is a side elevation of the device as detached from the hub of the wheel, parts being broken away. Fig. 3 is a detail showing the arm adapted to be attached to the steering knuckle for holding the instrument against rotation. Fig. 4 shows a horizontal section along the line 4 4 of Fig. 2, and looking in the direction of the arrows. Fig. 5 shows a modification in which an additional pair of beveled gears is used, for transmitting the motion of the main gear wheel to the indicating or registering instrument. Fig. 6 shows in elevation a modified form of the apparatus in which there is a beveled gear engagement between the rotating member and the gear wheel for transmitting this rotation; parts being broken away and parts being shown along the dotted line 6 6 of Fig. 7, looking in the direction of the arrows. Fig. 7 is an end view of the apparatus shown in Fig. 6 as seen from the right of said figure, parts being broken away. Fig. 8 shows in elevation another modification in which a friction wheel engages a rotating disk; parts being broken away and parts being shown along the dotted line 8 8 of Fig. 9, looking in the direction of the arrows. Fig. 9 is an end view of the device shown in Fig. 8 as seen from the right of said figure, and parts being broken away. Fig. 10 is an elevation of another modification in which a star wheel is operated by a spiral gear; parts being broken away, and parts being shown in section along the dotted line 10 10 of Fig. 11. Fig. 11 is a plan view of the device shown in Fig. 10, parts being broken away.

Referring now to Figs. 1 to 5, A and A' are two plates which are spaced apart by the ring $A^2$ and are held together by bolts or rivets C. These two plates A and A' with the ring $A^2$ thus form a casing for the gear wheels D and F, as will be herein further described.

B represents a housing which is attached to one side of the casing, and is provided with resilient lugs B' at either side of the slot $b^0$, which resilient lugs are clamped together by means of the screw $b'$.

D represents the main gear wheel, which is provided with perforated lugs $d$, by means of which it may be fastened to the hub of the wheel, preferably on the inside thereof. The two faces of this gear wheel D are grooved to permit the insertion of the packing rings E, which are preferably sewed together by stitches $e$ through holes in the web between the grooves of the gear wheel, but it will be obvious that these packing rings may be cemented or secured in place in any other convenient way. These packing rings are preferably made of felt or leather, or other material suitable for excluding dust from the interior of the casing. Also mounted in between the plates A and A' is the pinion F meshing with the gear wheel D, and having its shaft F' journaled in ball bearings G in the housing B. The end of this shaft has its sides flattened to facilitate connecting therewith the end of a flexible shaft M', which is mounted in a housing M, the end of which housing is clamped between the lugs B'. We have shown in Fig. 1 a speedometer N and an odometer O as driven by this shaft; but it will be obvious that the said shaft may be used to drive any suitable instrument or apparatus. It will be noted that the gear wheel D rotates with the hub L of the rotating wheel, and finds a bearing between the outer edge or the tops of its teeth, and the interior of the ring $A^2$, which with the plates A and A' form a raceway for said wheel D. To prevent the casing from being rotated through more than a small angle, some device should be provided for locking same against rotation relative to the vehicle body other than the restraining influence of the attached flexible shaft, and for this purpose, various restraining means may be provided, such for instance, as the lugs $a$ on the plates A and A', and the arm H, which is secured by the U bolt H' and the lock nuts $h$ to the arm K' of the steering knuckle K. This arm H projects in front of the lugs $a$ and prevents the casing from turning about the axis of the gear wheel D.

In order to provide a wider variation in ratio of the speed of the rotation of the rotating hub L and the flexible shaft, and also to permit variations in the angle of attachment of the flexible shaft to the journaled driving gear, additional gear wheels, preferably beveled gears, may be interposed between the main gear wheel D and the flexible shaft, such for instance, as shown in Fig. 5, which represents a section generally similar to that shown in Fig. 4 but on a larger scale, parts being omitted. In this modification, the shaft $F'$ carries a beveled pinion $F^3$, which meshes in the beveled pinion $F^4$, journaled in ball bearings G' mounted in housing $B^2$, screwed into the housing $B^3$, which is attached to the casing by means of the bolts C. The end of the shaft $F^5$ is flattened at its sides as at $f$, to facilitate the connection thereto of the flexible shaft.

By varying the relative sizes of the gear wheels $F^3$ and $F^4$, a varying velocity may be imparted to the shaft $F^5$ relative to the velocity of the gear wheel F.

As a further feature of interposing beveled gears between the shaft $F^2$ and the flexible shaft M', it will be noted that the said shaft M' may be connected in a substantially parallel direction to the face of the pinion F, moreover, the housings $B^2$ and $B^3$ may be set at any desired angle relative to the plane, passing through the axes of the pinions D and F, so that the end $f$ of the shaft $F^5$ may be turned to any convenient position for securing thereto the end of the flexible shaft M'.

It will be noted that, in the forms of the apparatus shown in Figs. 2, 4 and 5, the rotating member D supports the non-rotating member on the outer circumference of its gear teeth which bear against the inner surface of the race $A^2$, and that the non-rotating member may be held against turning in any convenient way, as by means of the lug $a$ and the arm H.

In the form of device shown in Figs. 6 and 7, the rotating member D' is in the form of a gear wheel having beveled teeth $d'$ on one side, and the circumference of this wheel forms a bearing for the non-rotating member or casing, which is provided with two lugs $a\ a$ adapted to engage a projecting arm carried by a fixed portion of the vehicle, such as the arm H of Fig. 3. In this form of apparatus, the circumference of wheel D' bears against the inner face of the ring $A^2$, and this wheel is secured to the hub of the vehicle by means of lugs $d$. The outer plate $A^3$ of the casing is provided with an annular recess $a^3$ to permit the free passage of the teeth $d'$, and these teeth mesh in a bevel gear $F^6$ mounted in housing $B^4$, on the shaft $F'$, whose spade end $f$ is adapted to engage the flexible shaft M', as shown in Fig. 1. The ring $A^2$ is provided with an outward projecting lug $A^0$, see Fig. 7, to support the base of the housing $B^4$.

It will be noted that the casing inclosing the rotary member may be set at any desired angle to the horizontal plane which may be desired, so as to obtain a convenient lead to the flexible shaft M'.

In the form of device shown in Figs. 8 and 9, the rotary member consists of a flat disk $D^2$ having lugs $d$ for connecting same to the hub of the wheel, and this disk rotates in the ring $A^2$ held between the plates A' and $A^4$. This ring $A^2$ has an enlarged portion $A^0$, see Fig. 9, which serves as a support to the base of the housing $B^5$, which housing is connected with the casing by means of the screws $b^7$, projecting into the slots $b^6$ in the base plate $b^5$ of the housing $B^5$. Journaled in this housing is the shaft $F^7$ carrying the wheel $F^6$, having a friction face, preferably in the form of a tire $f^6$, which friction face bears against the flat face of disk $E^2$, and thus the rotation of this disk $D^2$ is transmitted to the friction wheel, and by the spade end $f$ of the shaft $F^7$ is transmitted to the flexible shaft M' as shown in Fig. 1.

By having the housing $B^5$ attached to the casing with the screws $b^7$ passing into the curved slots $b^6$, the axis of the wheel may be shifted through a limited angle as indicated by the dotted line 1 1 of Fig. 8, causing the periphery of the wheel $F^6$ to engage the disk $D^2$ at a different angle, indicated by the dotted line 2 2 of Fig. 8. In this way, the relative speed of the wheel $F^6$ and the disk $D^2$ may be varied within certain limits, thus providing a simple and convenient adjustment for taking up losses due to wear of the parts or other causes. Such an adjustment would ordinarily only be needed within narrow limits, the error being due to the wear either on the parts of the indicating instrument itself such as the tire $f^6$ on the wheel $F^6$; or this error may be due to the wear on the tire of the vehicle itself. With vehicles having solid tires, the wear on the tire often accounts for material errors in the accuracy of the speed or distance indicating instrument, and this may be readily compensated for by the adjustment just referred to.

Reverting now to Figs. 10 and 11, the disk $D^2$, which is secured by lugs $d$ as before to the rotating hub, engages on its periphery with the ring $A^2$ held between the plates $A'$ and $A^5$. The plate $A^5$ has a raised portion $a^5$ to provide a recess for the spiral rib $d^0$ fast to the disk $D^3$, and this rib meshes with the teeth of the star wheel $F^8$ and turns the star wheel one tooth at a time, for every revolution of the disk $D^3$. This wheel is mounted on the shaft $F^9$ carrying the spade end $f$ which is adapted to be attached to the flexible shaft $M'$ as shown in Fig. 1. This shaft $F'$ carrying the star wheel $F^8$ is mounted in the housing $B^6$ having a flange $b^6$ secured to the casing as shown in Fig. 11.

In the form of device shown in Figs. 8 to 10, any suitable means for holding the casing against rotation may be provided, such as the lugs $a$, which engage any suitable arm attached to a fixed portion of the vehicle such as the arm H in Fig. 3.

It will be noted that in the devices shown in Figs. 2, 4, 5 and 6 to 9, the angular speed transmitted to the spade end $f$ and of the counter shaft, is greater than the angular speed of the main driving wheel or rotating member of the apparatus. Also in the form of device shown in Figs. 10 and 11, the angular speed is reduced down. This is especially desirable with instruments which are adapted for operation by means of a very slowly rotating flexible shaft, such for instance, as a taximeter.

While we have shown dust guards E in Figs. 2, 4 and 5, and have omitted these guards in the apparatus shown in Figs. 6 to 11; it is obvious that any suitable dust guards may be provided if desired.

An important advantage secured by our construction is found in facility, certainty and economy, with which all moving parts may be supplied with oil or other lubricant. Referring, for example, to Fig. 4, it will be seen that the housing B and the space surrounding the pinion F form a substantially oil-tight reservoir of appreciable volume, which, when filled with lubricant, insures a liberal supply to the bearing G, and to the gear D and ring $A^2$ by entrainment. The same applies to the forms of our invention shown in Figs. 6 and 7, 8 and 9 and 10 and 11. The washers E, Figs. 2 and 5, (omitted in Figs. 6 and 7, 8 and 9 and 10 and 11) serving to retain the lubricant.

It will be noted that in all the modifications herein described, there is a single unitary structure composed of a fixed and a rotating member, which latter may be applied to any part of a vehicle or other device, whose rotary movement is to be measured, and that any suitable means for holding the fixed member against rotation may be provided. Furthermore, it will be noted that the various operative parts of the herein described instrument are maintained in a substantially dust tight condition, and are thus not only protected against dust, mud and moisture, but are also protected against lack of attention in use, or the ordinary wilful injury to which such instruments in practice are found to be frequently subjected. It will be also noted that the casing, while preferably held against any appreciable rotation with regard to the rotary member, still has considerable lost motion with regard to the fixed part of the vehicle, and that this casing is at all times supported not on the vehicle itself, but on the rotary member of the instrument, which is fast to the hub or other rotating object. This arrangement obviates the necessity for any exact concentric relation between the rotating member of the instrument and the axis of rotation of the vehicle wheel. As a consequence of this, no special accuracy of mounting is required when the rotary member is attached to the vehicle wheel; and the instrument in itself is not affected either by such inaccuracy of the mounting, or by looseness of the vehicle wheel on its bearings, or by any jolts to which such apparatus is inevitably subjected. This, therefore, renders the instrument not liable to error from the causes just referred to, which causes vitally affect the efficiency, accuracy, reliability and durability of most of the apparatus now in use for kindred purposes.

It will be seen that the devices shown in Figs. 2, 4, 5, 8 and 9 comprise, throughout the major portion of the rotary member, a flat and exceedingly thin structure of no greater thickness than the thickness of the rotary member and the race, plus the thickness of the two dust excluding walls, which with the race form the outer casing. This is of special importance in applying the device to many of the automobiles already manufactured, or that may be hereafter manufactured according to present types. In these automobiles, it frequently happens that the distance between the hub and the knuckle is only a fraction of an inch, and if the device is to be applied to the inside of the hub, it is imperative that the instrument shall be very thin to go into the space provided, the housing for the secondary wheel projecting inward at one side, where there is room.

It is especially desirable to have the device attached to the inside of the hub, not only because this furnishes a convenient rotating object to attach the instrument to, but also because in this position, the hub and body of the wheel, together with the knuckle, effectually screen and guard the instrument against accidental injury from external objects.

It is obvious also that the unitary structure is equally adapted to be rigidly mounted upon the fixed portion of the vehicle, and the rotating member made to follow the rotation of the rotating wheel by the engagement with it of one or more arms or pins, or their equivalent, carried by the wheel.

It will be obvious that various modifications may be made in the herein-described apparatus, which may be used without departing from the spirit of our invention.

Having thus described our invention, what we claim and desire to secure by Letters Patent of the United States is:—

1. A rotation indicating device comprising a rotary member consisting of a wheel and a non-rotating member journaled on the periphery of said wheel, with means carried by said non-rotating member for transmitting a measure of the rotation of said wheel, substantially as described.

2. A rotation indicating device comprising a rotary member consisting of a wheel and a non-rotating member journaled on the periphery of said wheel, the sides of said non-rotating member forming a substantially dust tight casing for said wheel, with means carried by said non-rotating member for transmitting a measure of the rotation of said wheel, substantially as described.

3. A rotation indicating device, comprising a rotatable member consisting of a wheel, and a non-rotating member journaled on the periphery of said wheel, the sides of said non-rotating member forming lateral guides for said wheel, with means carried by said non-rotating member for transmitting a measure of the rotation of said wheel to a separate indicating instrument, substantially as described.

4. A rotation indicating device comprising a rotatable member consisting of a wheel, and a non-rotating member journaled on the periphery of said wheel, the sides of said non-rotating member forming a substantially oil tight chamber for said wheel, with means carried by said non-rotating member for transmitting a measure of the rotation of said wheel to a separate indicating instrument, substantially as described.

5. A rotation indicating device comprising a rotary member consisting of a wheel, and a non-rotating member journaled on the periphery of said wheel, a second wheel journaled in said non-rotating member and driven by the first wheel, and means for transmitting a measure of the rotation of the said second wheel to a separate indicating instrument, substantially as described.

6. A rotation indicating device comprising a rotary member consisting of a wheel, and a non-rotating member journaled on the periphery of said wheel, a second wheel journaled in said non-rotating member and driven by the first wheel, and a flexible shaft for transmitting the motion of said second wheel to a separate indicating instrument, substantially as described.

7. A rotation indicating device, comprising a rotatable member consisting of a wheel, and a non-rotating member journaled on the periphery of said wheel, means for holding said non-rotating member against rotation, with means carried by said non-rotating member for transmitting a measure of the rotation of said wheel to a separate indicating instrument, substantially as described.

8. A rotation indicating device comprising a rotary member consisting of a wheel, a ring exterior to said wheel and journaled on the periphery of said wheel, two annular plates secured to said ring and forming therewith a substantially dust proof casing for said wheel, a housing projecting from said casing near the periphery of said wheel, a pinion journaled in said housing and driven by said wheel, and means for transmitting a measure of the rotation of said pinion to an indicating instrument, substantially as described.

9. A rotation indicating device comprising a rotary member consisting of a wheel, a ring exterior to said wheel and journaled on the periphery of said wheel, two annular plates secured to said ring and forming therewith a substantially dust-proof casing for said wheel, a housing projecting from said casing near the periphery of said wheel, a pinion journaled in said housing and driven by said wheel, means for adjusting the angular velocity of said pinion relative to said wheel, and means for transmitting a measure of the rotation of said pinion to an indicating instrument, substantially as described.

10. A rotation indicating device comprising a rotary member consisting of a wheel, and a non-rotating member journaled on the periphery of said wheel, an arm detachably connected to some stationary part and holding said non-rotating member against rotation, with means carried by said non-rotating member for transmitting a measure of the rotation of said wheel, substantially as described.

11. A rotation indicating device comprising a rotary member consisting of a wheel, and a non-rotating member journaled on the periphery of said wheel, the sides of said non-rotating member forming a substantially dust-tight casing for said wheel, an arm detachably connected to some fixed part and holding said non-rotating member against rotation, with means carried by said non-rotating member for transmitting a measure of the rotation of said wheel, substantially as described.

12. A rotation indicating device comprising a rotary member consisting of a wheel and a non-rotating member journaled on the periphery of said wheel, an arm detachably connected to some fixed part and holding said non-rotating member against rotation, a second wheel journaled in said non-rotating member and driven by the first wheel, and means for transmitting a measure of the rotation of said second wheel to a separate indicating instrument, substantially as described.

13. In a rotation indicating apparatus, the combination with a casing formed of two plates and a ring forming an annular raceway, with a laterally-projecting housing, of a wheel journaled in said casing between said plates and having its periphery engaging said raceway, said wheel serving as a support to said casing, a pinion journaled in said housing and driven by said wheel, means for attaching said wheel to the rotary object, whose motion is to be indicated, and means for holding said casing against rotation, substantially as described.

14. In a rotation indicating apparatus, the combination with a casing formed of two plates and a ring forming an annular raceway, with a laterally-projecting housing, of a wheel journaled in said casing between said plates and having its periphery engaging said raceway, said wheel serving as a support to said casing, a pinion journaled in said housing and driven by said wheel, means for varying the relative speed of said pinion and said wheel, means for attaching said wheel to the rotary object whose motion is to be indicated, and means for holding said casing against rotation, substantially as described.

15. In a speed indicating apparatus, the combination with a casing formed of two plates and a ring forming an annular raceway, with a laterally-projecting housing, of a wheel journaled in said casing between said plates and having its periphery engaging said raceway, said wheel serving as a support to said casing, a pinion journaled in said housing and driven by said wheel, means for attaching said wheel to the rotary object whose motion is to be indicated, and an arm detachably connected to a fixed portion of the vehicle and adapted to hold said casing against rotation, substantially as described.

In testimony whereof, we affix our signatures, in presence of two witnesses.

HARRY P. C. BROWNE.
WILLIAM H. PALMER, Jr.

Witnesses:
F. F. SAMPSON,
R. E. GROSS, Jr.